(12) United States Patent
Xie et al.

(10) Patent No.: US 7,078,672 B2
(45) Date of Patent: Jul. 18, 2006

(54) METHOD AND SYSTEM FOR OPTICALLY TRACKING A TARGET USING INTERFEROMETRIC TECHNIQUE

(76) Inventors: Tong Xie, 4022 Lylewood Ct, San Jose, CA (US) 95121; Marshall Thomas DePue, 7 De Sabla Rd., #25, San Mateo, CA (US) 94402; Douglas M. Baney, 897 Clinton Rd., Los Altos, CA (US) 94024

( * ) Notice: Subject to any disclaimer, the term of this patent is extended or adjusted under 35 U.S.C. 154(b) by 183 days.

(21) Appl. No.: 10/758,981

(22) Filed: Jan. 16, 2004

(65) Prior Publication Data

US 2005/0156100 A1    Jul. 21, 2005

(51) Int. Cl.
*G06M 7/00* (2006.01)
(52) U.S. Cl. .................... 250/221; 250/203.2
(58) Field of Classification Search ............... 250/221, 250/203.2
See application file for complete search history.

(56) References Cited

U.S. PATENT DOCUMENTS 4,714,339 A * 12/1987 Lau et al. ................. 356/4.09

* cited by examiner

*Primary Examiner*—Georgia Epps
*Assistant Examiner*—Tony Lu

(57) ABSTRACT

An optical position-tracking system comprises an optical device for generating an incident light beam and a reference light beam from a light beam. Moreover, the optical position-tracking system further comprises a light beam steering device for sweeping the incident light beam through an angular range to cause a reflection of the incident light beam by a target, whereas the reflection of the incident light beam is directed to interfere with the reference light beam to form an interference light beam. Additionally, the optical position-tracking system enables determination of a position of the target using an interferometric technique utilizing an angular value of the incident light beam and the interference light beam, whereas the angular value depends on the reflection.

19 Claims, 10 Drawing Sheets

METHOD AND SYSTEM FOR OPTICALLY TRACKING A TARGET USING INTERFEROMETRIC TECHNIQUE

CROSS REFERENCE TO RELATED APPLICATION

The U.S. patent application Ser. No. 10/759,646, filed on Jan. 16, 2004, entitled "Position Determination and Motion Tracking", by Xie et al., assigned to the same assignee of the present Patent Application, is hereby incorporated by reference.

BACKGROUND OF THE INVENTION

1. Field of the Invention

The invention generally relates to optical systems. More particularly, the invention relates to optically tracking a target using an interferometric technique.

2. Related Art

A variety of systems and devices have been developed to enable the input of data into a computer system and to enable the navigation/cursor control for operating the computer system. The tremendous growth in the use of computer systems can be linked to advancements in these systems and devices.

These systems and devices typically utilize one of several technologies. Examples of these technologies include mechanical track-balls, acceleration detection, optical image correlation, laser speckle pattern analysis, and intensity detection. Other technologies are also used.

Although improvements in these systems and devices enhance the usability of computer systems, several deficiencies in the technologies implemented by these systems and devices continue to limit the potential benefits of these systems and devices. For example, technologies that have a limited resolution hinder use of the computer system. Moreover, the response time of some of these technologies can be slow. Other technologies can be used only on particular surface types. Moreover, power consumption issues arise in certain technologies. Lastly, the size required for systems or devices to implement some technologies can be disadvantageous.

Besides these deficiencies, other issues are associated with these existing technologies. In general, these existing technologies are limited to two-dimensional navigation/cursor control and relative coordinate tracking (e.g., change in position). That is, the change in the position of an object is tracked in two-dimensional space rather than the absolute position (e.g., current position) of the object. Relative coordinate tracking limits the usability of these system and devices in such applications as handwriting input, where absolute position tracking is needed. In sum, existing technologies have serious limitations that are difficult to overcome.

SUMMARY OF THE INVENTION

A method and system for optically tracking a target using an interferometric technique are disclosed. An optical position-tracking system comprises an optical device for generating an incident light beam and a reference light beam from a light beam. Moreover, the optical position-tracking system further comprises a light beam steering device for sweeping the incident light beam through an angular range to cause a reflection of the incident light beam by a target, whereas the reflection of the incident light beam is directed to interfere with the reference light beam to form an interference light beam. Additionally, the optical position-tracking system enables determination of a position of the target using an interferometric technique utilizing an angular value of the incident light beam and the interference light beam, whereas the angular value depends on the reflection. If the light beam has a plurality of wavelengths, either due to the existence of these wavelengths simultaneously, or over a time interval having multiple wavelengths, the absolute position of the target can be determined. If the light beam has a single wavelength, the relative position of the target can be determined.

BRIEF DESCRIPTION OF THE DRAWINGS

The accompanying drawings, which are incorporated in and form a part of this specification, illustrate embodiments in accordance with the invention and, together with the description, serve to explain the principles of embodiments in accordance with the invention.

DETAILED DESCRIPTION OF THE INVENTION

Reference will now be made in detail to embodiments in accordance with the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments in accordance with the invention, numerous specific details are set forth in order to provide a thorough understanding of the invention.

Figure 1:
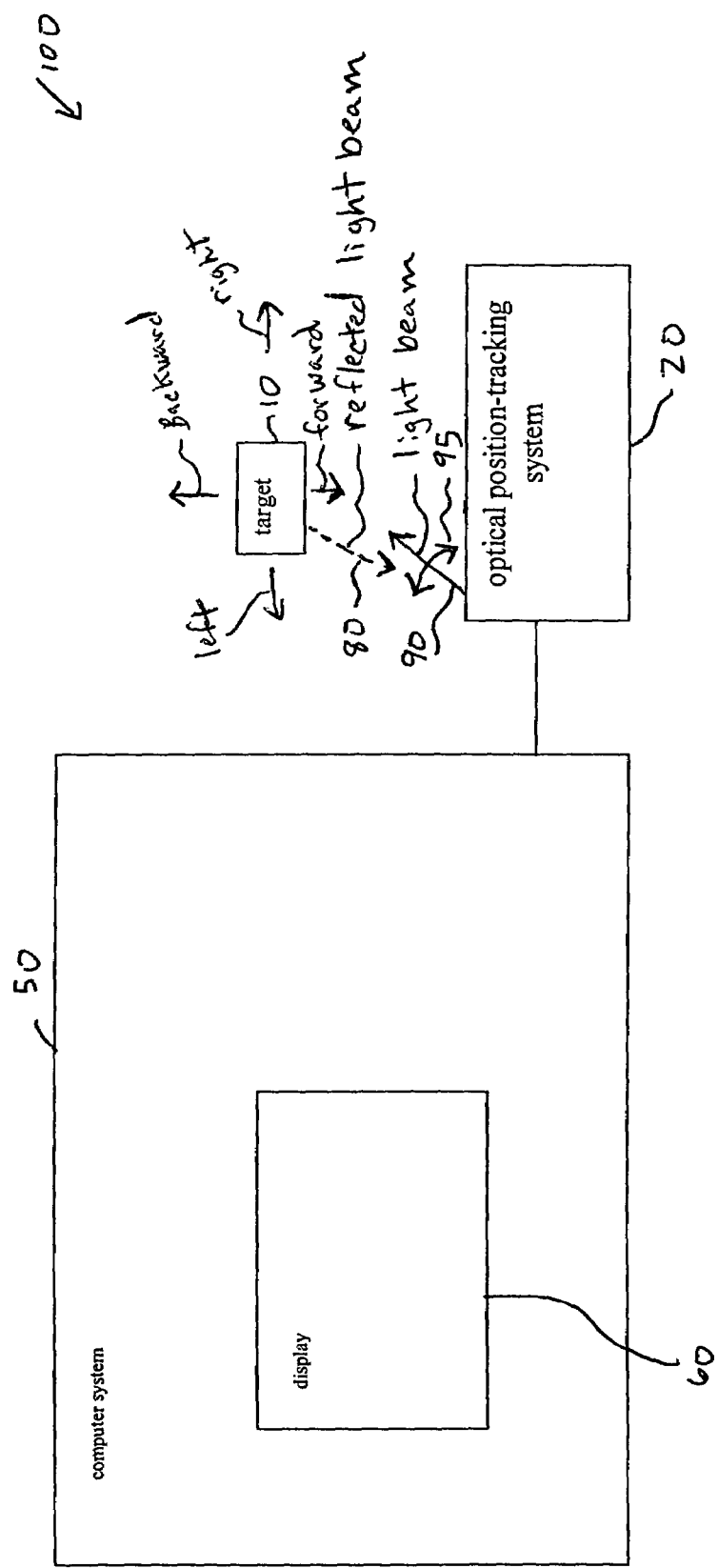
FIG. 1 illustrates a system of embodiments in accordance with the invention, showing an optical position-tracking system.

In embodiments in accordance with the invention, an optical position-tracking system comprises a light beam generator for generating a light beam and an optical device for generating an incident light beam and a reference light beam from the light beam. Moreover, the optical position-tracking system further includes a light beam steering device for sweeping the incident light beam through an angular range and for directing a reflection of the incident light beam to interfere with the reference light beam to form an interference light beam when the incident light beam is reflected by a target. The reflection of the incident light beam comprises a reflected light beam. Additionally, the optical position-tracking system further comprises a detector for detecting the interference light beam and a processing unit for determining a position of the target using an interferometric technique and data including an angular value of the incident light beam when the target reflects the incident light beam and the interference light beam which provides a distance to the target. If the light beam has a plurality of wavelengths, either due to the existence of these wavelengths simultaneously, or over a time interval having multiple wavelengths, the absolute position of the target can be determined. If the light beam has a single wavelength, the relative position of the target can be determined FIG. 1 illustrates a system 100 of embodiments in accordance with the invention, showing an optical position-tracking system 20. The system 100 includes a computer system 50 and an optical position-tracking system 20. The computer system 50 has a display 60.

In this embodiment in accordance with the invention, the optical position-tracking system 20 tracks the position of target as target is moved in a two-dimensional space. In particular, position-tracking system 20 utilizes at least one light beam 90 that is swept through an angular range 95 within the two-dimensional space. As target is moved left, right, forward, backward, or in any combination thereof within the two-dimensional space in which the light beam 90 is operating, the target may reflect the light beam 90. This reflection of the light beam 90 is comprised of a reflected light beam 80 that is received and processed by position-tracking system 20 to track the position of target 10.

The target can be any type of object. For example, target can be a mouse-type device, a pen, a touch screen input-type device, a finger, and the like. A retro-reflecting surface on target 10 enhances the capability of optical position-tracking system 20 to track the movement of target 10. If the target 10 has a sufficient reflective property, the retro-reflecting surface may not be necessary.

The motion of target tracked by optical position-tracking system 20 by generating position data corresponding to the position of target 10 can be utilized to input data (e.g., handwriting input) into computer system 50, to navigate on display 60, or to control a cursor of computer system 50.

In another embodiment in accordance with the invention, optical position-tracking system 20 is integrated with display 60 to provide touch screen functionality when the target 10 is moved around the surface of display 60. This implementation is less costly and less complicated than touch screen implementations of the prior art.

Structure (Relative Position Tracking Embodiment)

Figure 2:
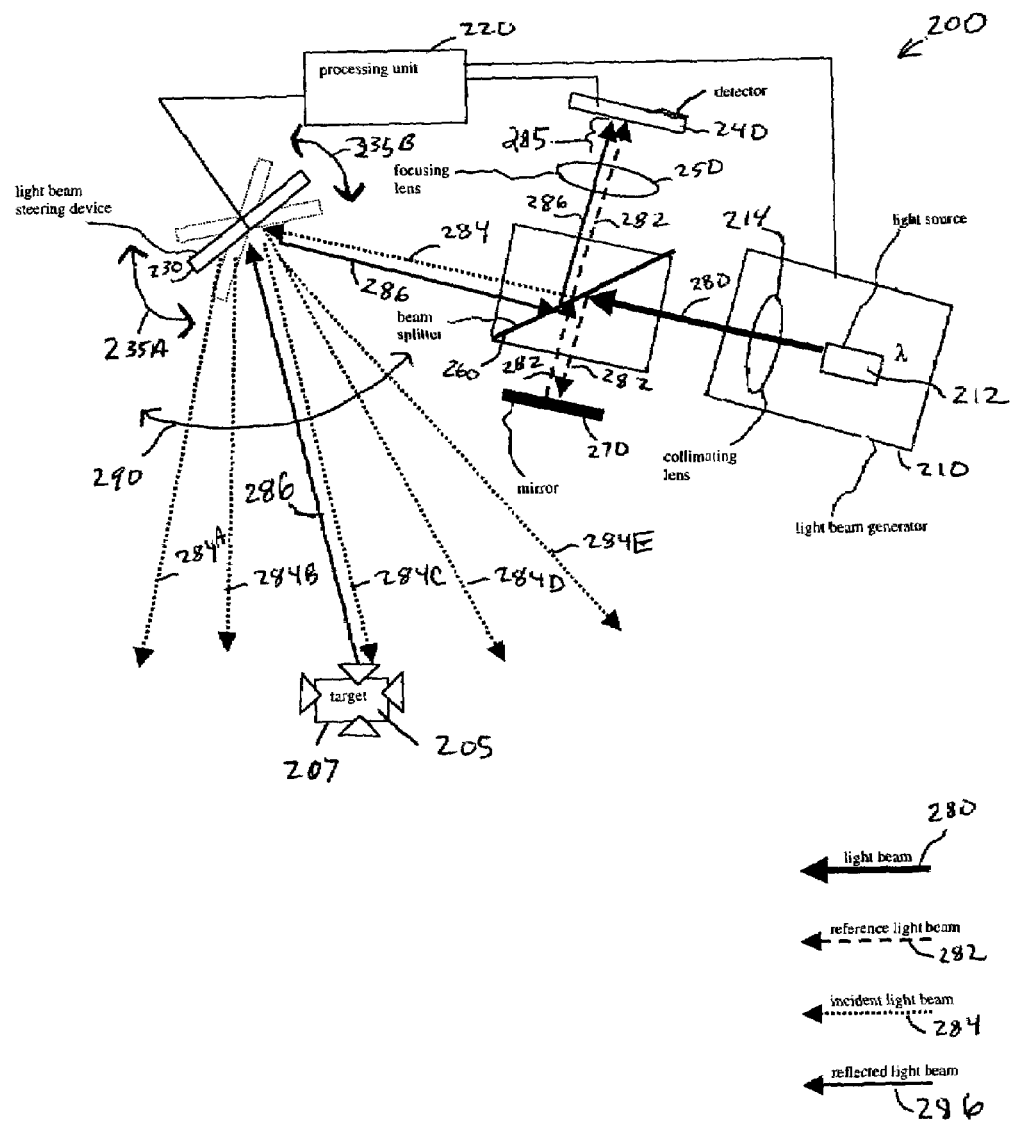
FIG. 2 illustrates an optical position-tracking system for tracking the relative position of a target of embodiments in accordance with the invention.

With reference to FIG. 2, a view is shown of an optical position-tracking system 200 for tracking the relative position of a target 205 of embodiments in accordance with the invention. The following discussion will begin with a description of the physical structure of the embodiments in accordance with the invention. This discussion will then be followed with a description of the operation of the embodiments in accordance with the invention.

With respect to the physical structure of the embodiments in accordance with the invention, FIG. 2 illustrates an optical position-tracking system 200 for tracking the relative position of a target 205 of embodiments in accordance with the invention. The relative position is determined in polar coordinates, whereas "relative position" refers to the change in the position of target 205 with respect to a prior position. As depicted in FIG. 2, the optical position-tracking system 200 has a light beam generator 210, an optical device 260, a mirror 270, a light beam steering device 230, a detector 240, a focusing lens 250, and a processing unit 220. In summary, the angular relationship of target 205 with respect to light beam steering device 230 is determined in conjunction with detector 240. Further, the relative distance to the target 205 from light beam steering device 230 is determined using an interferometric technique that relies on an interference light beam 250 formed by a reflected light beam 286 from target 205 interfering with a reference light beam 282. The interference light beam 250 is formed because the reflected light beam 286 and the reference light beam 282 have propagated along paths of difference lengths. Thus, when the reference light beam 282 and the reflected light beam 286 are combined (e.g., the interference light beam 250), they form an interference pattern of light and dark fringes that is received by the detector 240, whereas the light and dark fringes shift as the difference in path length changes. Therefore, the relative position of target 205 is represented by this angular relationship of target 205 and this relative distance to target 205.

The light beam generator 210 generates a light beam 280. Light beam generator 210 includes a light source 212 to generate the light beam 280. Light beam 280 is coherent and has a single wavelength $\lambda$. Moreover, light beam generator 210 has a collimating lens 214.

In one embodiment in accordance with the invention, the light source (e.g., light source 212) can be based on low-cost LED (light emitting diode) technology. In another embodiment in accordance with the invention, the light source can be based on VCSEL (vertical cavity surface emitting laser) technology. In yet another embodiment in accordance with the invention, the light source can be based on low-cost incandescent technology having suitable collimation capability. In still another embodiment in accordance with the invention, the light source can be based on high power rare-earth based lasers. Examples of rare-earth based lasers include Nd-YAG (Neodymium Yttrium Aluminum Garnet) lasers and pulsed Erbium lasers. The high power rare-earth based lasers can be used when the distance or absorption between the target 205 and the detector is such that higher optical powers are required.

Optical device 260 uses the light beam 280 to generate an incident light beam 284 and a reference light beam 282. In an embodiment in accordance with the invention, the optical device 260 is a beam splitter 260.

Figure 3:
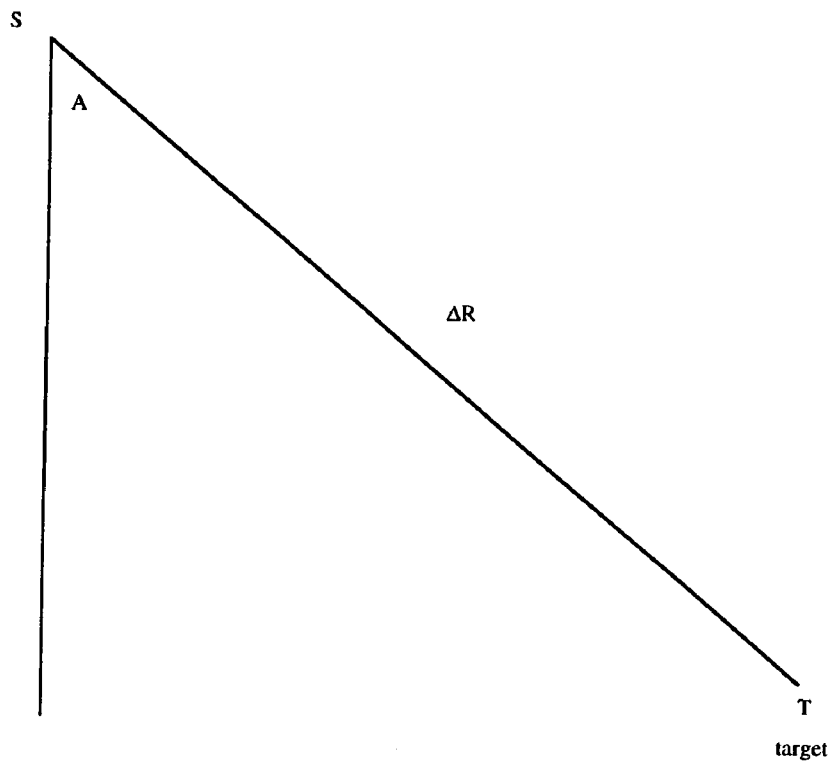
FIG. 3 illustrates the relative position of a target determined by the optical position-tracking system of FIG. 2 of embodiments in accordance with the invention.

Referring still to FIG. 2, light beam steering device 230 sweeps incident light beam 284 through the angular range 290. In order to illustrate the sweeping motion of incident light beam 284 caused by light beam steering device 230, FIG. 2 depicts incident light beam 284 in various angular locations (e.g., 284A–284E). Also, the angle of incident light beam 284 with respect to target 205 and light beam steering device 230 is tracked. This is depicted in FIG. 3 and will be discussed below in detail.

Continuing, light beam steering device 230 can be any type of light beam steering device. In one embodiment in accordance with the invention, the light beam steering device is a MEMS (microelectromechanical system) motor beam steering device. In another embodiment in accordance with the invention, the light beam steering device is a galvanometer beam steering device. In yet another embodiment in accordance with the invention, the light beam steering device is an acousto-optic beam steering device. In another embodiment in accordance with the invention, the light beam steering device is an electro-optic beam steering device. In still another embodiment in accordance with the invention, the light beam steering device is a grating structure beam steering device. In another embodiment in accordance with the invention, the light beam steering device is a holographic structure beam steering device. In another embodiment in accordance with the invention, the light beam steering device is a scanning mirror beam steering device. Substantial cost and size savings may be realized with MEMS processing.

As shown in FIG. 2, target 205 includes a retro-reflecting surface 207 for reflecting incident light beam 284. The term "retro-reflecting" refers to the property that an incident light beam is reflected in a parallel direction with respect to the incident light beam. The retro-reflecting surface 207 can be implemented in any manner such as retro-reflecting tape, retro-reflecting paint, or any other retro-reflecting material coupled to the surface of target 205. As described above, the target 205 can be any type of object. For example, target 205 can be a mouse-type device, a pen, a touch screen input-type device, a finger, and the like. If target 205 has a sufficient reflective property, the retro-reflecting surface may not be necessary as long as target 205 reflects an incident light beam in a parallel direction with respect to the incident light beam. As one example, the motion of an office pen with a retro-reflecting surface at the writing end can be tracked and used as the cursor control of a computer system.

Moreover, processing unit 220 is coupled to light beam steering device 230, detector 240, and light beam generator 210. Processing unit 220 determines the relative position of target 205 by using a variety of data and an interferometric technique.

In Operation (Relative Position Tracking Embodiment)

The following discussion sets forth in detail the operation of embodiments in accordance with the invention.

With reference to FIG. 2, the operation of the optical position-tracking system 200 proceeds as follows. Light source 212 generates light beam 280. Light beam 280 passes through collimating lens 214, which collimates light beam 280. After collimating lens 214, light beam 280 propagates towards beam splitter 260. The beam splitter 260 uses light beam 280 to generate an incident light beam 284 and a reference light beam 282. The reference light beam 282 is directed towards mirror 270, which reflects reference light beam 282 towards beam splitter 260 and then to detector 240.

Moreover, the incident light beam 284 is directed towards light beam steering device 230. The light beam steering device 230 sweeps the incident light beam 284 through the angular range 290 so that the incident light beam 284 appears at various angular positions (e.g., 284A–284E). Here, the arrows 235A and 235B show the light beam steering device 230 moving so that incident light beam 284 is swept through the angular range 290.

When retro-reflecting surface 207 of the target 205 reflects incident light beam 284 (e.g., 284C), the reflection of incident light beam 284C is reflected towards light beam steering device 230. The reflection of incident light beam 284C is comprised of a reflected light beam 286. Light beam steering device 230 directs the reflected light beam 286 to beam splitter 260 to interfere with the reference light beam 282 to form an interference light beam 285. Interference light beam 285 passes through a focusing lens 250, which focuses interference light beam 285, and reaches detector 240. Detector 240 detects interference light beam 285 and indicates to processing unit 220 that target 205 was located so that processing unit 220 records the current angle (e.g., angle A of FIG. 3) of incident light beam 284C. In an embodiment in accordance with the invention, processing unit 220 tracks the angle of incident light beam 284 swept by light beam steering device 230.

Detector 240 detects the interference light beam 285, which is comprised of reflected light beam 286 and reference light beam 282. Processing unit 220 determines the relative distance (e.g., relative distance ΔR of FIG. 3) to target 205 from the light beam steering device 230 using an interferometric technique.

FIG. 3 illustrates the relative position T of a target 205 determined by the optical position-tracking system 200 of FIG. 2 of embodiments in accordance with the invention. As shown in FIG. 3, the position S of the light beam steering device 230 is known. The angle A corresponds to the angle at which the incident light beam 284 was reflected by the target 205, causing the detector 240 to detect the interference light beam 285 formed by reflected light beam 286 interfering with reference light beam 282. As described above, the angular values of the incident light beam 284 are tracked. An interferometric technique described below enables the determination of the relative distance ΔR to the target 205 from the light beam steering device 230, whereas the interferometric technique may involve using the wavelength of the light source 212 and counting fringes of the interference light beam 285 (e.g., signal 410 of FIG. 4). Hence, the relative position of the target 205 includes the current angle (e.g., angle A of FIG. 3) of the incident light beam 284 and the relative distance (e.g., relative distance ΔR of FIG. 3) to the target 205 from the light beam steering device 230.

Figure 4:
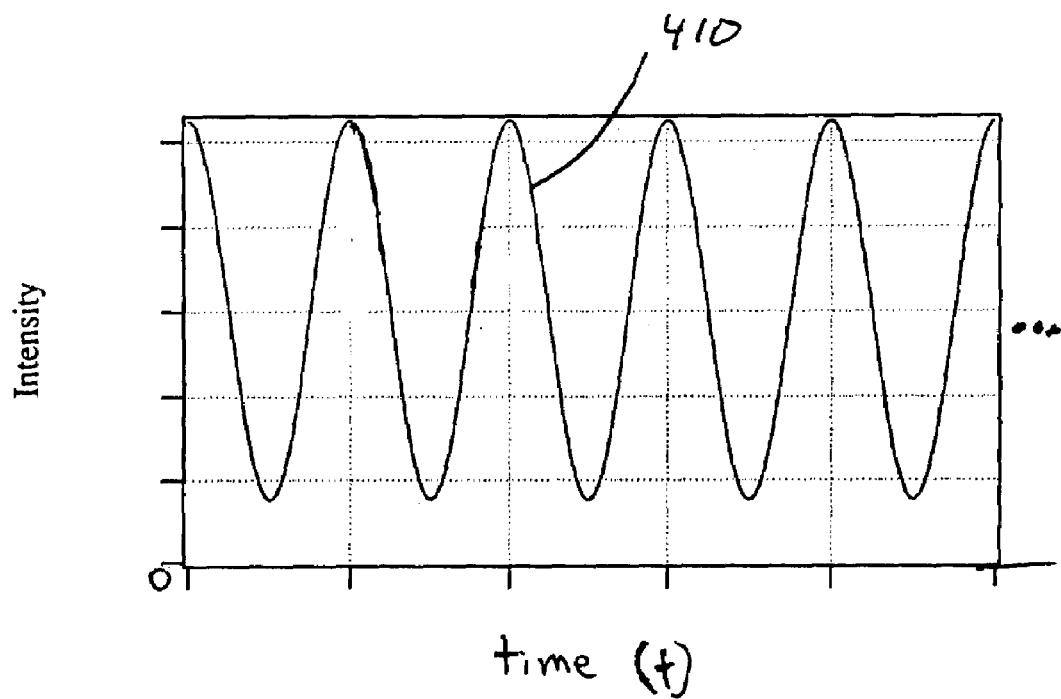
FIG. 4 illustrates a signal generated by a detector of FIG. 2 in response to an interference light beam of embodiments in accordance with the invention.

FIG. 4 illustrates a signal 410 generated by detector 240 of FIG. 2 in response to an interference light beam 285 of embodiments in accordance with the invention. As shown in FIG. 4, the peaks in signal 410 correspond to fringes of interference light beam 285. According to the interferometric technique that can be utilized in embodiments in accordance with the invention, the number of fringes that pass a reference point are counted. This number and the wavelength of the light source 212 can be utilized to determine the difference in length traveled by the reference light beam 282 as compared to that traveled by incident light beam 284 and reflected light beam 286, yielding the relative distance (e.g., relative distance ΔR of FIG. 3) from the light beam steering device 230 to the target 205. Reference light beam 282 travels a known distance while the incident light beam 284 and reflected light beam 286 travel the distance to be measured.

Structure (Absolute Position Tracking Embodiment)

Figure 5:
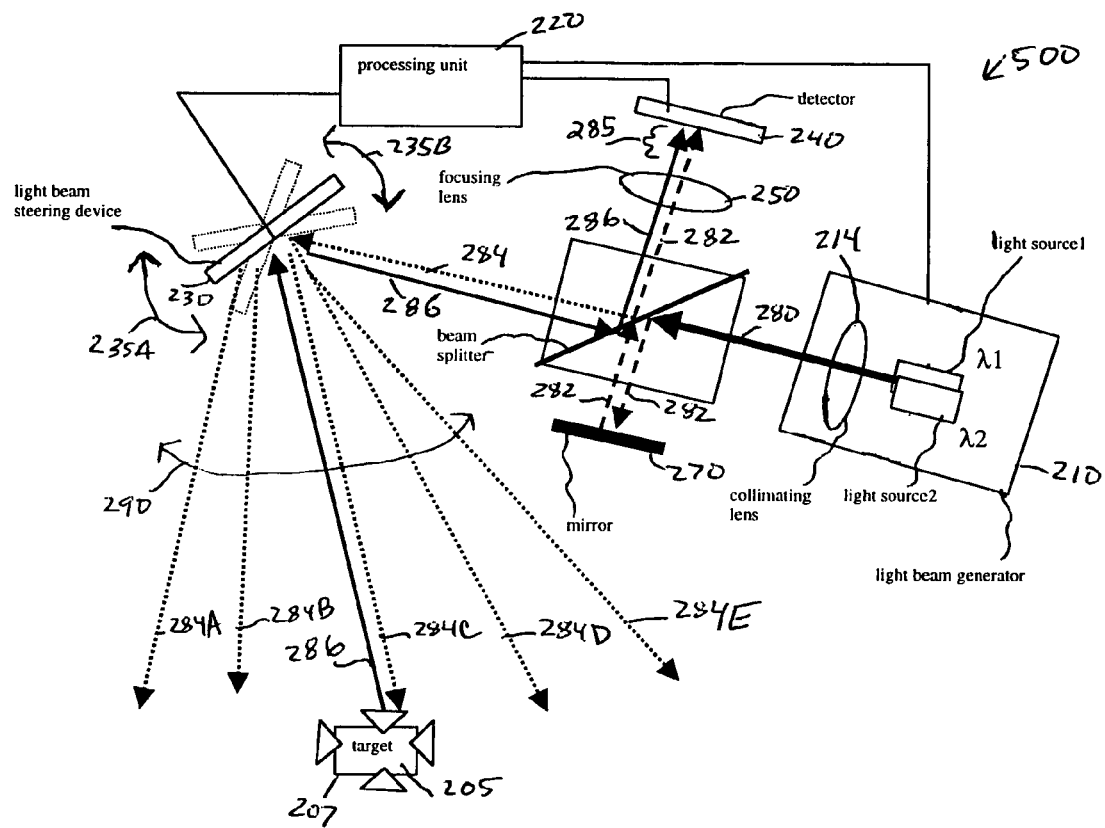
FIG. 5 illustrates an optical position-tracking system for tracking the absolute position of a target of embodiments in accordance with the invention.
Figure 5:
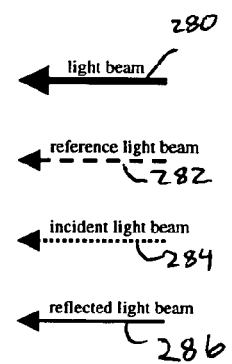

With reference to FIG. 5, a view is shown of an optical position-tracking system 500 for tracking the absolute position of a target 205 of embodiments in accordance with the invention. The following discussion will begin with a description of the physical structure of the embodiments in accordance with the invention. This discussion will then be followed with a description of the operation of the embodiments in accordance with the invention.

With respect to the physical structure of the embodiments in accordance with the invention, FIG. 5 illustrates an optical position-tracking system 500 for tracking the absolute position of a target 205 of embodiments in accordance with the invention. As depicted in FIG. 5, the optical position-tracking system 500 has a light beam generator 210, an optical device 260, a mirror 270, a light beam steering device 230, a detector 240, a focusing lens 250, and a processing unit 220. In summary, the angular relationship of target 205 with respect to light beam steering device 230 is determined in conjunction with detector 240. Further, the absolute distance to target 205 from light beam steering device 230 is determined using an interferometric technique that relies on light beams having multiple wavelengths and an interference light beam formed by a reflected light beam from target 205 interfering with a reference light beam. The interference light beam is formed because the reflected light beam and the reference light beam have propagated along paths of difference lengths. Therefore, the absolute position of target 205 is represented by this angular relationship of target 205 and this absolute distance to target 205.

While the optical position-tracking system 200 of FIG. 2 enabled the tracking of the relative position of the target 205, the optical position-tracking system 500 enables the tracking of the absolute position of the target 205. Unless described differently below, the structural discussion with regard to FIG. 2 is applicable to FIG. 5.

Unlike FIG. 2, optical position-tracking system 500 of FIG. 5 includes a light beam generator 210 that generates a light beam 280 that has a plurality of wavelengths (e.g., λ1 and λ2). In an embodiment in accordance with the invention, the light beam generator 210 includes a light source1 having a first wavelength λ1 and a light source2 having a second wavelength λ2. In another embodiment in accordance with the invention, light beam generator 210 includes a light source having a first wavelength λ1 and a second wavelength λ2. In another embodiment in accordance with the invention, the light source optical wavelength is rapidly varied between a first wavelength λ1 and a second wavelength λ2. Thus, over a time interval, the light source exhibits multiple wavelengths. In yet another embodiment in accordance with the invention, light beam generator 210 has a broadband light source having a plurality of wavelengths between a first wavelength and a second wavelength. The broadband light source can provide a cost savings compared to the other implementations. The discussion with respect to FIG. 2 concerning the types of light sources that can be used is equally applicable to FIG. 5.

In another embodiment in accordance with the invention, optical position-tracking system 500 has a plurality of detectors for detecting separate interference patterns of interference light beam 285 at different wavelengths (e.g., λ1 and λ2).

In Operation (Absolute Position Tracking Embodiment)

The following discussion sets forth in detail the operation of embodiments in accordance with the invention.

With reference to FIG. 5, the operation of the optical position-tracking system 500 proceeds similarly to that described with respect to FIG. 2. Unless described differently below, the operational discussion with regard to FIG. 2 is applicable to FIG. 5. Before initiating tracking of target 205, the wavelength λ1 of light source1 and the wavelength λ2 of light source2 are calibrated to determine a phase relationship. The light beam 280 is comprised of a plurality of wavelengths.

Detector 240 detects the interference light beam 285, which is comprised of reflected light beam 286 and reference light beam 282. Processing unit 220 determines the absolute distance (e.g., absolute distance R of FIG. 6) to target 205 from the light beam steering device 230 using an interferometric technique.

Figure 6:
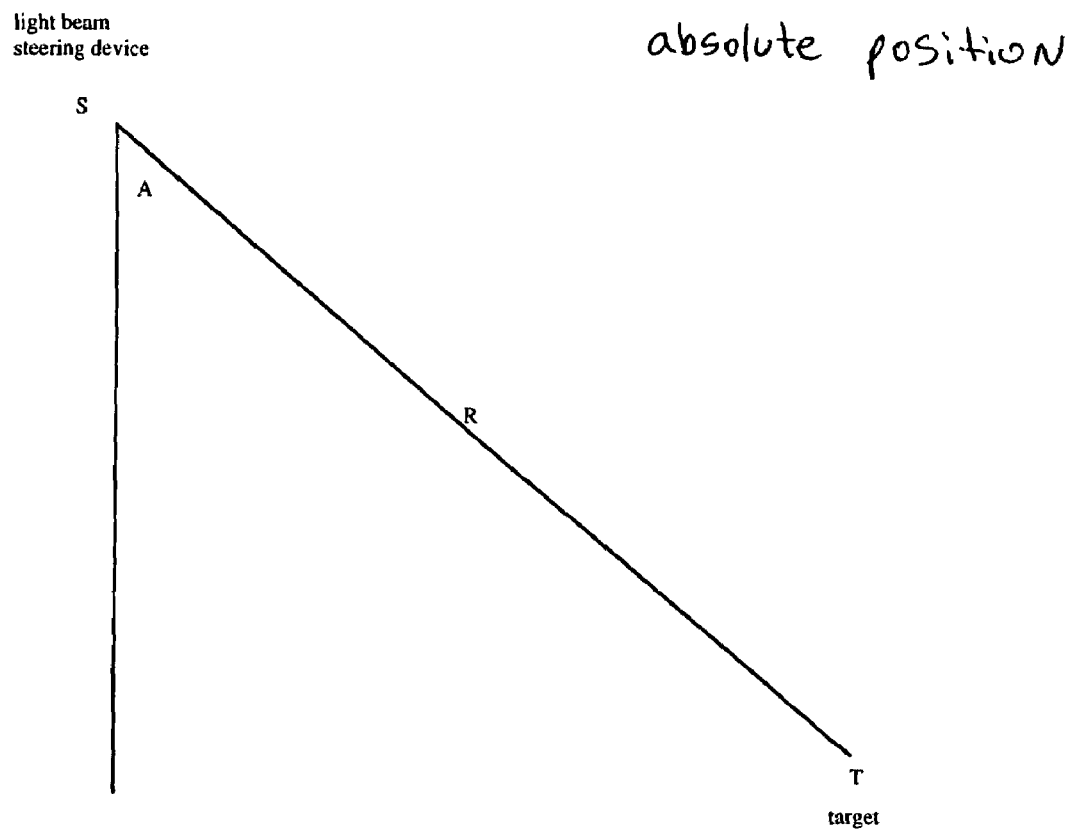
FIG. 6 illustrates the absolute position of a target determined by the optical position-tracking system of FIG. 5 of embodiments in accordance with the invention.

FIG. 6 illustrates the absolute position T of a target 205 determined by the optical position-tracking system 500 of FIG. 5 of embodiments in accordance with the invention. As shown in FIG. 6, the position S of the light beam steering device 230 is known. The angle A corresponds to the angle at which the incident light beam 284 was reflected by the target 205, causing the detector 240 to detect the interference light beam 285 formed by the reflected light beam 286 interfering with the reference light beam 282. As described above, the angular values of the incident light beam 284 are tracked. An interferometric technique described below enables the determination of the absolute distance R to target 205 from the light beam steering device 230, whereas the interferometric technique may involve use of multiple wavelengths to determine an absolute distance. Hence, the absolute position of target 205 includes the current angle (e.g., angle A of FIG. 6) of the incident light beam 284 and the absolute distance (e.g., absolute distance R of FIG. 6) to the target 205 from the light beam steering device 230.

Figure 7:
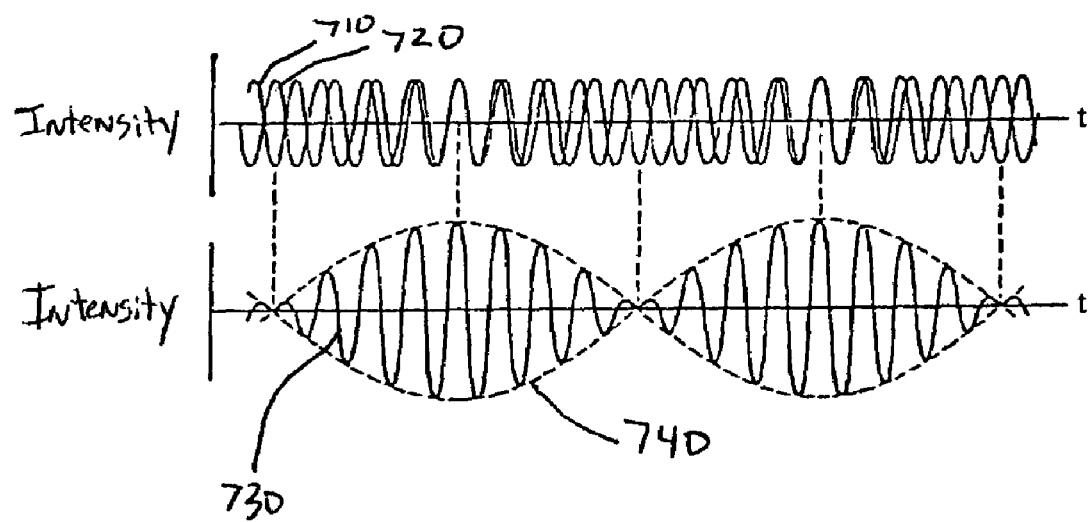
FIG. 7 illustrates a plurality of signals generated by a detector of FIG. 5 in response to an interference light beam of embodiments in accordance with the invention.

When the light beam 280 has a first wavelength λ1 and a second wavelength λ2, the interference light beam 285 has a first interference pattern at the first wavelength λ1 and a second interference pattern at the second wavelength λ2. Interference light beam 285 can be separated into the first interference pattern and the second interference pattern, enabling separate detectors to detect each interference pattern. FIG. 7 shows the signal 710 corresponding to the first interference pattern and generated by a first detector and the signal 720 corresponding to the second interference pattern and generated by a second detector of embodiments in accordance with the invention. Moreover, FIG. 7 illustrates a signal 730 generated by the detector 240 of FIG. 5 in response to an interference light beam 285 of embodiments in accordance with the invention. That is, the signal 730 is the superposition of signals 710 and 720. As shown in FIG. 7, there is a phase relationship between signals 710 and 720 that results in the beat signal 740. According to the interferometric technique that can be utilized in embodiments in accordance with the invention, this beat signal 740 can be processed to determine a phase shift in the calibrated phase relationship of light source1 and light source2. This enables the determination of the length traveled by reference light beam 282 as compared to that traveled by the incident light beam 284 and the reflected light beam 286, yielding the absolute distance (e.g., absolute distance R of FIG. 6) from the light beam steering device 230 to the target 205.

In another embodiment in accordance with the invention, when the wavelength tuned light source is utilized, the interferometric technique may convert the interference pattern into a frequency, $f_b$, whose value determines the absolute distance to the target 205 according to mathematical relations similar to $R=(1/2)f_b*v/r$ with * representing multiplication, v being the light velocity and r being the rate of change of optical frequency of the wavelength tuned source.

The effect of internal delay errors causing a change in $f_b$ is easily compensated by adjusting R by the calibrated offset.

In another embodiment in accordance with the invention, when the broadband light source is utilized, the interferometric technique may involve processing the coherent envelope of the signal 730 generated by the detector 240 to extract the absolute distance to the target 205 from the light beam steering device 230.

Although FIGS. 2 and 5 illustrate two-dimensional target tracking with a light beam steering device, it should be understood that embodiments in accordance with the invention can be extended to include three-dimensional target tracking by including a light beam steering device along the third dimension.

Optical position-tracking systems 200 and 500 provide numerous advantages. The motion of the target can be tracked in two-dimensions or in three-dimensions while providing absolute position data of the target in the case of optical position-tracking system 500 and while providing relative position data of the target in the case of optical position-tracking system 200. In a relative position tracking system of the prior art, determination of new position of a target depends on the prior position of the target. When the target is moved in a manner that can not be tracked (e.g., lifting a mouse from a surface), the relative position tracking system of the prior art cannot determine a new position until the target again moves in a manner that can be tracked. In contrast, if the target is moved in a handwriting manner in the light beam sweeping space of optical position-tracking system 500, absolute position data gives the current location of the target irrespective of the prior position, facilitating handwriting input into a computer system. Even if the target is moved out of range of the light beam sweeping space of optical position-tracking system 500 (e.g., by lifting the target above the light beam sweeping space), the absolute position of the target can be determined immediately after the target moves into range of the light beam sweeping space of optical position-tracking system 500.

Moreover, the optical position-tracking systems 200 and 500 can provide high resolution tracking of the target while not being limited to particular surface types for the target. For example, the mechanical track-ball mouse of the prior art requires a smooth surface to operate properly while the optical mouse of the prior art has difficulty with pure white surfaces. With respect to the target, the operation of the optical position-tracking systems 200 and 500 is passive and tetherless. Compact, low cost, and low power consumption implementations are possible with the optical position-tracking systems 200 and 500. Moreover, the optical position-tracking systems 200 and 500 are easily scalable. The number of components illustrated in FIGS. 2 and 5 is sufficient to track the motion of the target in either a short range application or a long range application. However, the capability requirements of these components in these applications may be different.

Figure 8A:
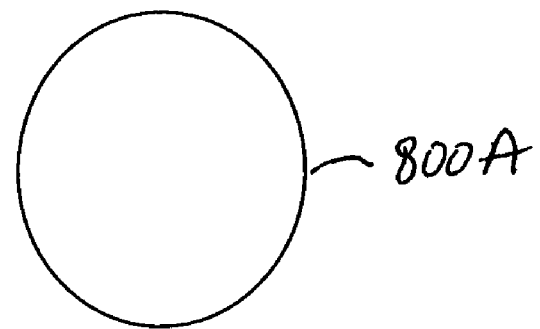
FIG. 8A illustrates a circular cross-section of a light beam of embodiments in accordance with the invention.

FIG. 8A illustrates a circular cross-section 800A of a light beam of embodiments in accordance with the invention. A light beam having this circular cross-section 800A can be utilized in the optical position-tracking systems 200 (FIG. 2) and 500 (FIG. 5). The smaller the circular cross-section 800A the greater the resolution of the optical position-tracking systems 200 (FIG. 2) and 500 (FIG. 5).

Figure 8B:
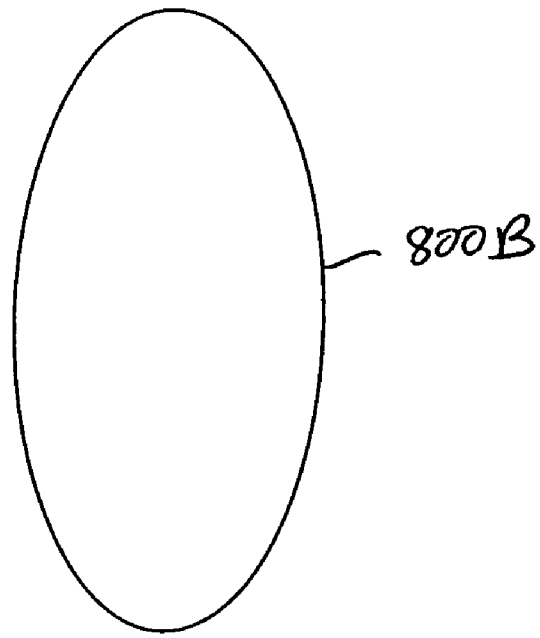
FIG. 8B illustrates an elliptical cross-section of a light beam of embodiments in accordance with the invention.

FIG. 8B illustrates an elliptical cross-section 800B of a light beam of embodiments in accordance with the invention. A light beam having the elliptical cross-section 800B can be utilized in the optical position-tracking systems 200 (FIG. 2) and 500 (FIG. 5) to provide some tracking tolerance if the target 205 is moved perpendicular to the sweeping direction of the light beam steering device. Since the elliptical cross-section 800B extends perpendicular to the sweeping direction, the tracking range of the optical position-tracking systems 200 (FIG. 2) and 500 (FIG. 5) can be extended perpendicular to the sweeping direction.

Figure 9:
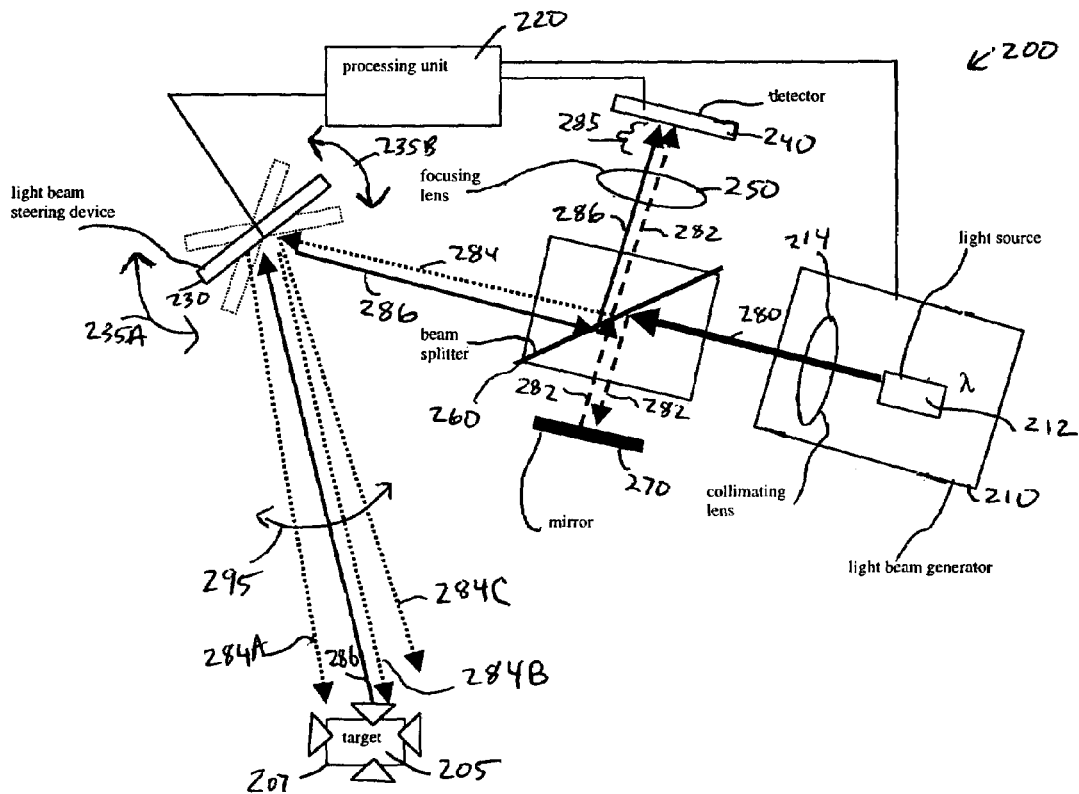
FIG. 9 illustrates the optical position-tracking system of FIG. 2 operating in a limited sweeping mode of embodiments in accordance with the invention.

FIG. 9 illustrates optical position-tracking system 200 of FIG. 2 operating in a limited sweeping mode of embodiments in accordance with the invention. While in FIG. 2 light beam steering device 230 is sweeping through the full angular range 290, in FIG. 9 the light beam steering device 230 is sweeping through the limited angular range 295. This limited sweeping mode can increase the speed at which the target 205 is located and can increase resolution.

In practice, the light beam steering device 230 initially operates in the full sweeping mode (e.g., full angular range 290). However, once the target 205 is located at a first angle with respect to the light beam steering device 230, light beam steering device 230 sweeps around the first angle for a limited angular range 295 so that incident light beam 284 appears at various angular positions (e.g., 284A–284C). This dithering movement of light beam steering device 230 provides a significant benefit when the motion of the target 205 is not expected to vary significantly within a short amount of time. Light beam steering device 230 returns to operating in the full sweeping mode when the target 205 no longer reflects incident light beam while in the limited sweeping mode.

The discussion with respect to FIG. 9 is equally applicable to the optical position-tracking system 500 of FIG. 5.

Figure 10:
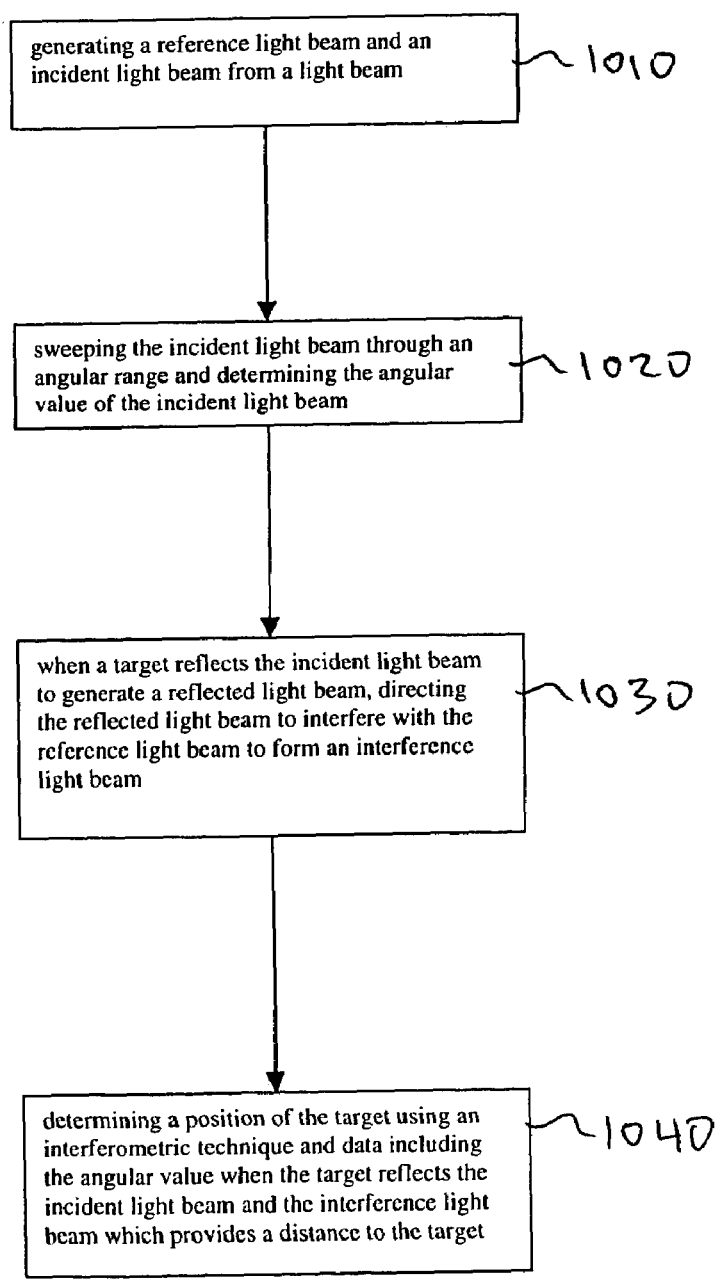
FIG. 10 illustrates a flow chart showing a method of optically tracking a target of embodiments in accordance with the invention.

FIG. 10 illustrates a flow chart showing a method 1000 of optically tracking a target of embodiments in accordance with the invention.

At Step 1010, a reference light beam and an incident light beam are generated from a light beam. If the light beam has a single wavelength, the relative position of the target can be tracked. If the light beam has a plurality of wavelengths, either due to the existence of these wavelengths simultaneously, or over a time interval having multiple wavelengths, the absolute position of the target can be tracked. Continuing, at Step 1020, the incident light beam is swept through an angular range by a light beam steering device. Moreover, the angular value of the incident light beam is determined.

Furthermore, at Step 1030, when the target reflects the incident light beam to generate a reflected light beam, the reflected light beam is sent to interfere with the reference light beam to form an interference light beam.

At Step 1040, the position of the target is determined using an interferometric technique utilizing data. Data, such as the angular value of the incident light beam when the target reflects the incident light beam and the interference light beam that provides a distance to the target from the light beam steering device, are used.

The foregoing descriptions of specific embodiments in accordance with the invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. An optical position-tracking system comprising:
   an optical device for generating an incident light beam and a reference light beam from a light beam, wherein said light beam has a plurality of wavelengths; and
   a light beam steering device for sweeping said incident light beam through an angular range to cause a reflection of said incident light beam by a target, wherein said reflection of said incident light beam is directed to interfere with said reference light beam to form an interference light beam, wherein an absolute position of said target is determined using an interferometric technique utilizing said plurality of wavelengths of said light beam and an angular value of said incident light beam and said interference light beam, and wherein said angular value depends on said reflection.

2. The optical position-tracking system as recited in claim 1 further comprising a processing unit for determining said position of said target.

3. The optical position-tracking system as recited in claim 1 wherein said target includes a retro-reflecting surface.

4. The optical position-tracking system as recited in claim 1 wherein if said target reflects said incident light beam when said incident light beam is at a particular angular value, said light beam steering device sweeps said incident light beam through a limited angular range that includes said particular angular value until said target fails to reflect said incident light beam.

5. The optical position-tracking system as recited in claim 1 wherein said light beam steering device is one of a MEMS (microelectromechanical system) motor beam steering device, a galvanometer beam steering device, an acousto-optic beam steering device, an electro-optic beam steering device, a grating structure beam steering device, a holographic structure beam steering device, and a scanning mirror beam steering device.

6. The optical position-tracking system as recited in claim 1 wherein said light beam is generated by a light source selected from a group consisting of an incandescent technology-based light source, a LED (light emitting diode) technology-based light source, a semiconductor laser technology-based light source, and a rare-earth laser technology-based light source.

7. A system comprising:
   an optical device for generating an incident light beam and a reference light beam from a light beam, wherein said light beam has a plurality of wavelengths;
   a light beam steering device for sweeping said incident light beam through an angular range to cause a reflection of said incident light beam by a target, wherein said reflection of said incident light beam is directed to interfere with said reference light beam to form an interference light beam, wherein an absolute position of said target is determined using an interferometric technique utilizing said plurality of wavelengths of said light beam and an angular value of said incident light beam and said interference light beam, and wherein said angular value depends on said reflection; and
   a computer system for receiving and using said position of said target.

8. The system as recited in claim 7 further comprising a processing unit for determining said position of said target.

9. The system as recited in claim 7 wherein said position enables controlling a cursor in said computer system.

10. The system as recited in claim 7 wherein said position enables inputting data into said computer system.

11. The system as recited in claim 7 wherein said target includes a retro-reflecting surface.

12. The system as recited in claim 7 wherein if said target reflects said incident light beam when said incident light beam is at a particular angular value, said light beam steering device sweeps said incident light beam through a limited angular range that includes said particular angular value until said target fails to reflect said incident light beam.

13. The system as recited in claim 9 wherein said light beam steering device is one of a MEMS (microelectromechanical system) motor beam steering device, a galvanometer beam steering device, an acousto-optic beam steering device, an electro-optic beam steering device, a grating structure beam steering device, a holographic structure beam steering device, and a scanning mirror beam steering device.

14. The system as recited in claim 7 wherein said light beam is generated by a light source selected from a group consisting of an incandescent technology-based light source, a LED (light emitting diode) technology-based light source, a semiconductor laser technology-based light source, and a rare-earth laser technology-based light source.

15. A method of optically tracking a target, said method comprising:
   generating an incident light beam and a reference light beam from a light beam, wherein said light beam has a plurality of wavelengths;
   sweeping said incident light beam through an angular range and determining an angular value of said incident light beam;
   when said target reflects said incident light beam to generate a reflected light beam, directing said reflected light beam to interfere with said reference light beam to form an interference light beam; and
   determining an absolute position of said target using an interferometric technique utilizing said plurality of wavelengths of said light beam and said angular value of said incident light beam and said interference light beam, wherein said angular value depends on said reflected light beam.

16. The method as recited in claim 15 wherein said target includes a retro-reflecting surface.

17. The method as recited in claim 15 wherein said sweeping step includes:
   if said target reflects said incident light beam when said incident light beam is at a particular angular value, sweeping said incident light beam through a limited angular range that includes said particular angular value until said target fails to reflect said incident light beam.

18. The method as recited in claim 15 wherein said sweeping step is performed by a light beam steering device, and wherein said light beam steering device is one of a MEMS (microelectromechanical system) motor beam steering device, a galvanometer beam steering device, an acousto-optic beam steering device, an electro-optic beam steering device, a grating structure beam steering device, a holographic structure beam steering device, and a scanning mirror beam steering device.

19. The method as recited in claim 15 wherein said light beam is generated by a light source selected from a group consisting of an incandescent technology-based light source, a LED (light emitting diode) technology-based light source, a semiconductor laser technology-based light source, and a rare-earth laser technology-based light source.

* * * * *